US011341265B1

(12) United States Patent
Gunawardena

(10) Patent No.: US 11,341,265 B1
(45) Date of Patent: May 24, 2022

(54) FUNCTION-CALL INTERCEPTOR FRAMEWORK FOR MANAGING ACCESS TO ON-DEVICE CONTENT DEEMED SENSITIVE BY THE USER

(71) Applicant: Dilip Suranjith Gunawardena, Redwood Shores, CA (US)

(72) Inventor: Dilip Suranjith Gunawardena, Redwood Shores, CA (US)

( * ) Notice: Subject to any disclaimer, the term of this patent is extended or adjusted under 35 U.S.C. 154(b) by 171 days.

(21) Appl. No.: 15/899,717

(22) Filed: Feb. 20, 2018

(51) Int. Cl.
| *H04L 29/06* | (2006.01) |
| *G06F 21/62* | (2013.01) |
| *G06F 21/32* | (2013.01) |

(52) U.S. Cl.
CPC .......... *G06F 21/6245* (2013.01); *G06F 21/32* (2013.01)

(58) Field of Classification Search
CPC . G06F 21/6245; G06F 21/32; H04L 63/1466; H04L 63/20; H04L 63/164; H04L 63/166
USPC .......................................................... 726/28
See application file for complete search history.

(56) References Cited

U.S. PATENT DOCUMENTS

| 6,253,193 B1 * | 6/2001 | Ginter ..................... G06F 21/86 705/57 |
| 7,028,300 B2 * | 4/2006 | Goldick ................... G06F 9/52 707/999.001 |
| 7,287,161 B2 * | 10/2007 | Vaha-Sipila ............ G06F 21/53 713/161 |
| 9,038,152 B1 * | 5/2015 | Vazquez ................. H04L 63/08 726/6 |
| 9,224,096 B2 * | 12/2015 | Oppenheimer ..... G06F 11/3419 |
| 10,311,152 B2 * | 6/2019 | Berrington ............ G06F 16/128 |
| 2014/0295956 A1 * | 10/2014 | Katz ................... G07F 17/3237 463/29 |

* cited by examiner

*Primary Examiner* — Longbit Chai
(74) *Attorney, Agent, or Firm* — Useful Arts IP

(57) ABSTRACT

Nowadays much information pertaining to the user's life tends to be stored on their mobile device. Some of this information is considered strictly confidential by the user—not to be divulged to anybody else, not even to family members, co-workers or other intermittent borrowers of the user's device. Hence the significant user demand for an on-device Secure Vault for the placement of all such confidential content-files, with access to each such file individually-protected by a user-keyed access restriction method. This invention fulfils that demand.

6 Claims, 3 Drawing Sheets

FUNCTION-CALL INTERCEPTOR FRAMEWORK FOR MANAGING ACCESS TO ON-DEVICE CONTENT DEEMED SENSITIVE BY THE USER

CROSS-REFERENCE TO RELATED APPLICATIONS/INCORPORATION BY REFERENCE

[Not Applicable.]

FEDERALLY-SPONSORED RESEARCH OR DEVELOPMENT

[Not Applicable.]

MICROFICHE/COPYRIGHT REFERENCE

[Not Applicable.]

FIELD OF THE INVENTION

Certain embodiments of this invention relate to a method and system for empowering the device-owner to prevent device-borrowers from accessing sensitive on-device content.

BACKGROUND OF THE INVENTION

Access-restriction methods and systems for managing access to user-designated content-files are rapidly evolving.

Currently garnering attention are access-restriction methods and systems based upon biometrics and geolocation, either in isolation or in combination.

1. The following are two such biometrics-based access-restriction methods and systems:
   1.1 Face Recognition of the registered user's face:
      The genuine user is granted file access to the face-tagged content files in the Secure Vault, because their current facial scan matches their already-registered facial scan.
      Whereas an interloper is denied file access to those files, because the interloper's face does not match the registered user's face.
   1.2 Fingerprints Recognition of the registered user's fingerprints:
      The genuine user is granted file access to the fingerprints-tagged content files in the Secure Vault, because their current fingerprints scan matches their already-registered fingerprints scan.
      Whereas an interloper is denied file access to those files, because the interloper's fingerprints do not match the registered user's fingerprints.
      Any, several or all fingers of a user can be used for fingerprints recognition.
2. The following is one such geolocation-based access-restriction method and system:
   The Geolocation Graticule—Latitude, Longitude, Altitude, and the user-defined space immediately surrounding it—wherefrom the last successful save action was performed upon the content-file, and testing whether it encloses the current Geolocation point wherefrom the content-file retrieval is being attempted:
      Access is granted to the geolocation-tagged content files in the Secure Vault if the current file retrieval attempt is also being performed from within the same physical geolocation graticule.
      Whereas if the user, or a thief who has stolen the user's smartphone, attempts to retrieve any of those files from any other physical geolocation graticule they will not succeed.

Given the modular decoupled overall design of this invention, the above access-restriction methods and systems 1.1, 1.2 and 2, as well as future access-restriction methods and systems yet to be conceived, can all be integrated in any appropriate combination into the invention.

BRIEF SUMMARY OF THE INVENTION

This invention provides a novel capability for the device user to manage access to sensitive on-device content.

Various advantages, aspects and novel features of the present invention, as well as details of an illustrated embodiment thereof, will be more fully understood from the following description and drawings.

This is referred to in [003] USAGE SCENARIO.

Figure 2:
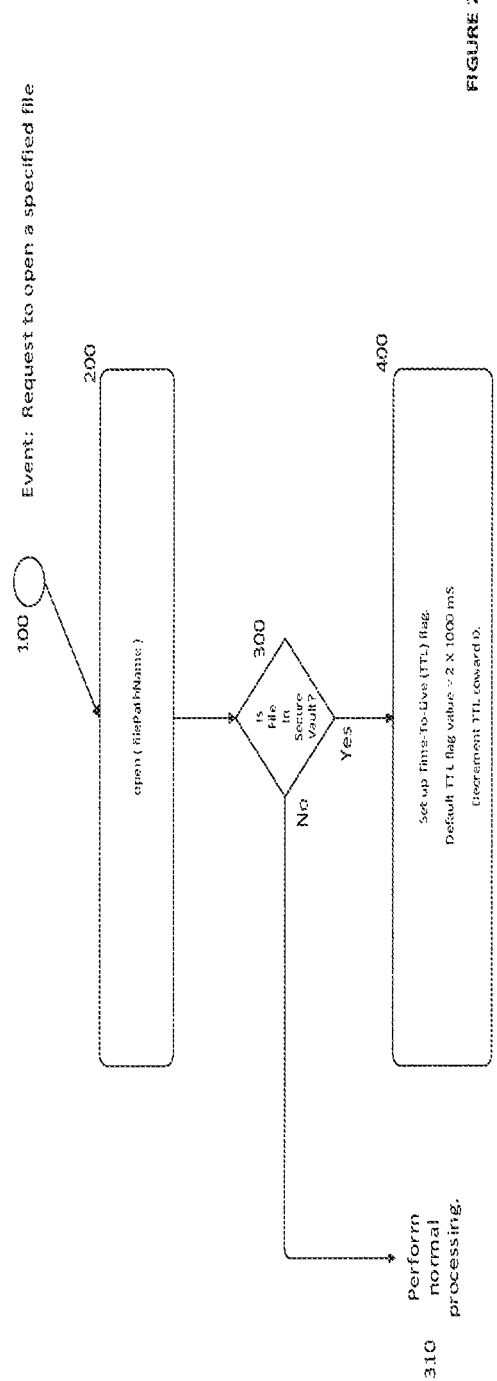

FIG. 2: The "file retrieve" workflow for both standard (ie. non-secured) and secured files.

This is referred to in [003] USAGE SCENARIO.

Figure 3:
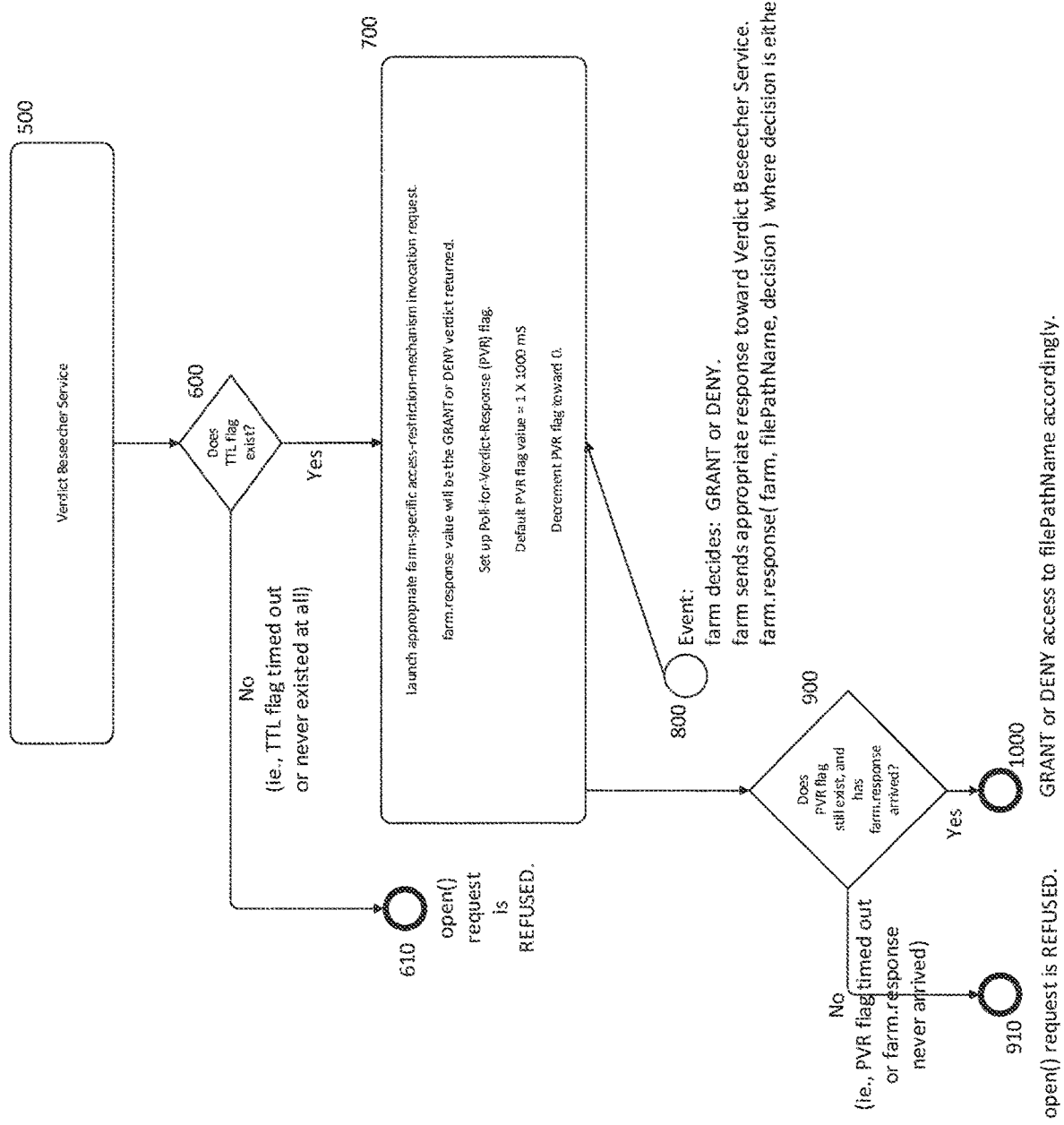

FIG. 3: The secured file retrieval attempt GRANT or DENY decision workflow.

This is referred to in [003] USAGE SCENARIO.

DETAILED DESCRIPTION OF THE INVENTION

It is only the content-files deemed sensitive by the user which will be intercepted by this invention's interceptor, provided certain other conditions apply.

This invention consists of an operating system kernel-level function call interceptor interacting with one or more plug-in access-restriction methods and systems.

The operating system kernel-level functions, the function call interceptor, and the plug-in access-restriction methods and systems, are provided in a computer system.

For a content-file deemed by the user to be non-sensitive, this invention's interceptor does not apply.

The operating system is exemplified by the Linux operating system, and by the Android mobile operating system which is Linux with specific modifications. [1]

The operating system kernel is exemplified by the Linux operating system kernel, and by the Android kernel which is the Linux kernel with specific modifications. [1]

The operating system kernel-level function call, that is a candidate for interception, is exemplified by the Linux kernel function call open( ). [1]

[001] System Overview

This invention pertains to, but is not limited to, any Linux system; the implementation describes, but is not limited to, the specific instance of an Android system.

This invention is exemplified by an Android kernel system function call interceptor mechanism to restrict user access to content-files placed in a designated Secure Vault on the smartphone or tablet.

In the example of Android, but not limited thereto, the interceptor interacts directly with the Android Run-Time and the Android Software Development Kit—without any need for user-space C program modules or the Android Native Development Kit.

Definition of Terms

Access-Restriction Policy File:
"filePathName.farm"
Thus for a farm method and system exemplified by Face Recognition, the Access-Restriction Policy File could be named:
"filePathName.face"
Whereas for a farm method and system exemplified by Fingerprint Recognition, the Access-Restriction Policy File could be named:
"filePathName.fing"
Whereas for a farm method and system exemplified by Geolocation Graticule, the Access-Restriction Policy File could be named:
"filePathName.geol"
Android:
Android is a mobile operating system developed by Google Inc. based upon the Linux kernel and designed primarily for touchscreen mobile devices such as smartphones and tablets. [1]
Android Kernel:
The Android kernel is a Linux kernel with specific modifications. [1]
Android Run-Time:
Android Run-Time (ART) is the managed runtime used by applications and some system services on Android. [3]
Android SDK (Software Development Kit):
Android applications are usually developed in the Java programming language using the Android SDK, but other development environments are also available. [4]
Content-file of interest (ie., the path to, and the name of, such content-file):
"filePathName"
farm:
File Access Restriction Method
A content-file placed in the Secure Vault has associated with it one or more farms.
These farm methods and systems are exemplified by Face Recognition, Fingerprint Recognition and Geolocation Graticule.
farm.response:
The response sent by the farm toward the Verdict Beseecher Service as response to the intent. This is the expected Grant-or-Deny verdict, together with the farm name and the farm filepathname.
The verdict is either 1 signifying GRANT or 0 signifying DENY.
Geolocation Graticule:
One of an imaginary collection of three-dimensional quadrilaterals (approximating to equally-sized cubes) covering the Earth's idealized spherical surface and its atmosphere.
The dimensions of such a three-dimensional quadrilateral are user-defined, defaulting to (Length=10 metre)×(Width=10 metre)×(Height=10 metre).
Thus any terrestrial geolocation point, as defined by its Latitude, Longitude and Altitude, fits inside exactly one geolocation graticule—unless it falls exactly on an edge, but even in that case it can be in no more than eight geolocation graticules.

In practice Altitude is usually disregarded, in which case the geolocation graticules collapse into equally-sized squares covering the Earth's idealized spherical surface. [7]
HKDF scheme:
HMAC-based Extract-and-Expand Key Derivation Function
HKDF is a simple key derivation function (KDF) based on a hash-based message authentication code (HMAC).
It is formally described in the RFC 5869, "HMAC-based Extract-and-Expand Key Derivation Function (HKDF)". [8]
HMAC:
Hash-based Message Authentication Code
A keyed-hash message authentication code (HMAC) is a specific type of message authentication code (MAC) involving a cryptographic hash function and a secret cryptographic key. It may be used to simultaneously verify both the data integrity and the authentication of a message, as with any MAC. Any cryptographic hash function, such as SHA3-512, may be used in the calculation of an HMAC; the resulting MAC algorithm is termed HMAC-X, where X is the hash function used (e.g. HMAC-SHA3-512). The cryptographic strength of the HMAC depends upon the cryptographic strength of the underlying hash function, the size of its hash output, and the size and quality of the key.
An iterative hash function breaks up a message into blocks of a fixed size and iterates over them with a compression function. The size of the output of HMAC is the same as that of the underlying hash function (e.g., 512 bits in the case of SHA3-512), although it can be truncated if desired.
HMAC does not encrypt the message. Instead, the message (encrypted or not) must be sent alongside the HMAC hash. Parties with the secret key will hash the message again themselves, and if it is authentic, the received and computed hashes will match.
It is formally described in the RFC 2104, "HMAC: Keyed-Hashing for Message Authentication". [9]
It is specified and approved in "The Keyed-Hash Message Authentication Code (HMAC)", FIPS Publication 198-1, National Institute of Standards and Technology, July 2008. [10]
A function for generating a secret key for HMAC is exemplified by HKDF.
HMAC-SHA3-512:
An exemplification of a modern HMAC algorithm. [11]
Registered by the National Institute of Standards and Technology with Object Identifier "id-hmacWith-SHA3-512 OBJECT IDENTIFIER::={hashAlgs 16}". [11]
Intent:
An intent, as exemplified by its presence in the Android system, is a software mechanism that allows users to coordinate the functions of different activities to accomplish a task. An intent is a messaging object which provides a facility for performing late runtime binding between the code in different applications as exemplified in the Android development environment. Its most significant use is in the launching of activities, wherein it can be considered the glue between activities: Intents provide an inter-application messaging system that encourages collaboration and component reuse. [5]

An intent can contain an explicitly-named component class, "component"; and a bundle of extra data, "extras", providing extra information to the component. [6]

Kernel Space:

See "Kernel Space (and Kernel Mode) versus User Space (and User Mode)" definition.

Kernel Space (and Kernel Mode) versus User Space (and User Mode):

The division of a computer system's memory into kernel space and user space is essential for ensuring system stability and security.

Kernel mode processes and threads execute at higher priority levels than user mode processes and threads.

Kernel Space and User Space correspond to their respective memory virtual address spaces. Every process in Linux utilizes its own separate virtual address space.

The kernel space virtual address space is shared between all the processes.

When a process is active, it can either be running in "user mode" or "kernel mode".

If a process is running in User mode it means that the CPU is running the user space side of code.

A process running in the user mode has limited capability and is controlled by a flag in the CPU. Even though the kernel memory is present in the process's memory map the user space code is not allowed to access the kernel space code (It can do so in some special way).

When a user mode process wants to perform a function other than merely move data around in its own virtual memory, as exemplified by the opening of a file, it must make a system call to communicate with the kernel space.

Each CPU architecture has its unique way of making a system call, but the basic workflow remains the same, i.e:

An initial instruction is executed; the CPU turns on the "privileged mode" flag, and jumps to a special address in kernel space, the "system-call entry point".

Once the above system-call reaches the kernel space, then the process runs in kernel mode and executes instructions from the kernel space memory.

Taking the same example of open system call, to find the requested file, the kernel may consult with file-system drivers (to figure out where the file is) or block device drivers (to load the necessary blocks from disk) or network device drivers (to load the file from a remote source).

These drivers can be either built-in or loadable as modules, but the key point is that they are part of kernel space.

Loading a module is done with a system-call that asks the kernel to copy the module's code and data into kernel space and run its initialization code in kernel mode.

If the kernel cannot process the request then the process is made to sleep by the kernel, and when the request is complete then the system call returns back to the user space.

Returning back to user mode means restoring the CPU registers to what they were before coming to Kernel Mode and changing the CPU privilege level to non-privileged. [12]

open( ) function:

open( ) is the operating system kernel-level function call for attempting to open a specified file at a specified file-system location. [1] [2]

Operating System Kernel:

The kernel is a computer program that is the core of a computer's operating system, with complete control over every operation and every resource within the system, the first operation of which is the first program loaded on start-up. It handles the rest of start-up as well as input/output requests from software, and translates them into data-processing instructions for the central processing unit. It also handles resources such as memory and peripherals such as speakers.

A kernel connects the application software to the hardware of a computer.

The critical code of the kernel is usually loaded into a protected area of memory, which prevents it from being overwritten by applications or other, more minor parts of the operating system. The kernel performs its tasks, such as running processes and handling interrupts, in kernel space. In contrast, everything a user does is in user space. This separation prevents user data and kernel data from interfering with each other and causing instability and slowness.

The kernel's interface is the layer at which a kernel process or thread makes requests of the kernel. A process making a request of the kernel is termed a system call. [2]

Poll-for-Verdict-Response (PVR) flag:

PVR is the maximum period-of-time, necessarily shorter than TTL, during which the VerdictBeseecher listens for a "securedResponse" from the farm to the Secured Intent (fired by the VerdictBeseecher).

The PVR flag is set up by the VerdictBeseecher as a timer loop, default 1×1000 milliseconds.

Salted secret key for HMAC:

The Hash-based Message Authentication Code key, salted with a cryptographic nonce to ensure that multiple HMAC calculation operations on even the same message will always yield different results.

The salted secret key for HMAC is used to assure message integrity and uniqueness of each Secured Intent and its corresponding securedResponse.

The secret key for HMAC (unsalted) is kept confidential and is stored in the Secure Vault; it is exemplified by a 512-bit random number.

Prior to its use in providing message integrity and uniqueness for an outgoing message (ie. a Secured Intent or a securedResponse), the secret key for HMAC is salted with a non-confidential cryptographic nonce as salt; this salt is exemplified by another 512-bit random number.

Next, using the above salted secret key for HMAC, the outgoing message's HMAC is calculated (ie., the message digest is calculated and the digest is encrypted) and sent along with the message; this HMAC algorithm is exemplified by HMAC-SHA3-512.

When subsequently validating the message integrity and uniqueness of an incoming message (ie. a Secured Intent or a securedResponse), the above salt is discarded and the (now unsalted) secret key for HMAC is used (ie., the incoming encrypted purported message digest is decrypted using the same HMAC algorithm with the unsalted secret key for HMAC, and compared for equality with an independently-calculated digest of the incoming message).

A function for generating a secret key for HMAC is exemplified by HKDF.

Secure Vault:

The on-device Secure Vault is the file-system location for the placement of all content-files deemed sensitive by the user, with access to each such file individually-protected by a user-keyed access restriction method.

The Secure Vault contains the following files:
- The device secret key for HMAC (used for ensuring the integrity and uniqueness of each Secured Intent and securedResponse).
- Each content-file deemed sensitive by the user.
- The Access-Restriction Policy File or files associated with that specific sensitive content-file.

The Secure Vault file-system location is exemplified in Linux and Android by "/securevault/" whose Read, Write and Execute permissions are restricted to Owner.

Secured Intent

An intent paired with a salted secret-keyed HMAC of the intent (to ensure the intent's integrity and uniqueness).

The HMAC algorithm is exemplified by HMAC-SHA3-512. A function for generating a secret key for HMAC is exemplified by HKDF.

securedResponse:

The "farm.response" to a Secured Intent, paired with a salted secret-keyed HMAC of the farm.response.

The HMAC algorithm is exemplified by HMAC-SHA3-512.

A function for generating a secret key for HMAC is exemplified by HKDF.

Time-To-Live (TTL) flag:

TTL is the maximum period-of-time during which all processing must complete and the content-file be opened or not, depending upon the GRANT or DENY verdict made by the farm and communicated back towards the VerdictBeseecher in the farm's "securedResponse".

In an implementation exemplified by, but not limited to, Android the TTL flag is implemented in the operating system kernel subdirectory /sys/kernel/msgs/ as a timer loop, default value 2×1000 milliseconds, during which a custom kernel process continuously interrogates the farm.response verdict for either a "1" signifying a GRANT verdict or a "0" signifying a DENY verdict.

If and only if the kernel process sees a "1", ie. a GRANT verdict, within the TTL time-period does the kernel process leave the timer loop and open the content-file.

Whereas if the kernel process sees a "0", ie. a DENY verdict, within the TTL time-period, then the kernel process leaves the timer loop and refuses to open the content-file.

Whereas if by the expiry of the TTL time-period the kernel process has not seen either a "1" or a "0", then the kernel process refuses to open the content-file.

User Space:

See "Kernel Space (and Kernel Mode) versus User Space (and User Mode)" definition.

VerdictBeseecher:

VerdictBeseecher is a user-mode system service, the "Verdict Beseecher Service".

It is exemplified by its implementation on Android within user-space in Java utilizing the Android SDK.

It is launched at startup, and is always running (or recovering).

It sets up a PVR flag timer.

It immediately thereafter fires a Secured Intent.

This Secured Intent consists of:
- an Intent, which in its Android exemplification contains:
  - the Component "servicename", which is the specific farm whose GRANT-or-DENY verdict is being beseeched,
  - and
  - the two Extras "servicename" (to identify which specific farm the GRANT-or-DENY verdict response will hopefully be coming from), and "securedResponse" (the expected GRANT-or-DENY verdict response itself, secured to preclude tampering, replay and repeat attacks).
- paired with
  - a salted secret-keyed HMAC of the intent (to ensure the intent's integrity and uniqueness).

After firing the above Secured Intent, VerdictBeseecher listens (within the PVR flag timer's lifetime) for a "securedResponse" from the farm to the Secured Intent (fired by the VerdictBeseecher).

This "securedResponse" should contain a "farm.response" which should contain the farm's verdict—either "1" signifying GRANT or "0" signifying DENY.

[If PVR flag times out, or farm verdict is not received, or farm verdict received is neither "1" nor "0", then content-file-access is refused.]

REFERENCES

[1]: https://en.wikipedia.org/wiki/Android_(operating_system)
[2]: https://en.wikipedia.org/wiki/Kernel_(operating_system)
[3]: https://source.android.com/devices/tech/dalvik/
[4]: https://en.wikipedia.org/wiki/Android_software_development
[5]: https://en.wikipedia.org/wiki/Intent_(Android)
[6]: https://developer.android.com/reference/android/content/Intent.html
[7]: https://en.wikipedia.org/wiki/Geographic_coordinate_system
[8]: https://tools.ietf.org/html/rfc5869
[9]: https://www.ietf.org/rfc/rfc2104.txt
[10]: http://nvlpubs.nist.gov/nistpubs/FIPS/NIST.FIPS.198-1.pdf
[11]: https://csrc.nist.gov/Projects/Computer-Security-Objects-Register/Algorithm-Registration
[12]: https://learnlinuxconcepts.blogspot.com/2014/02/kernel-space-and-user-space.html

[003] Usage Scenario

Figure 1:
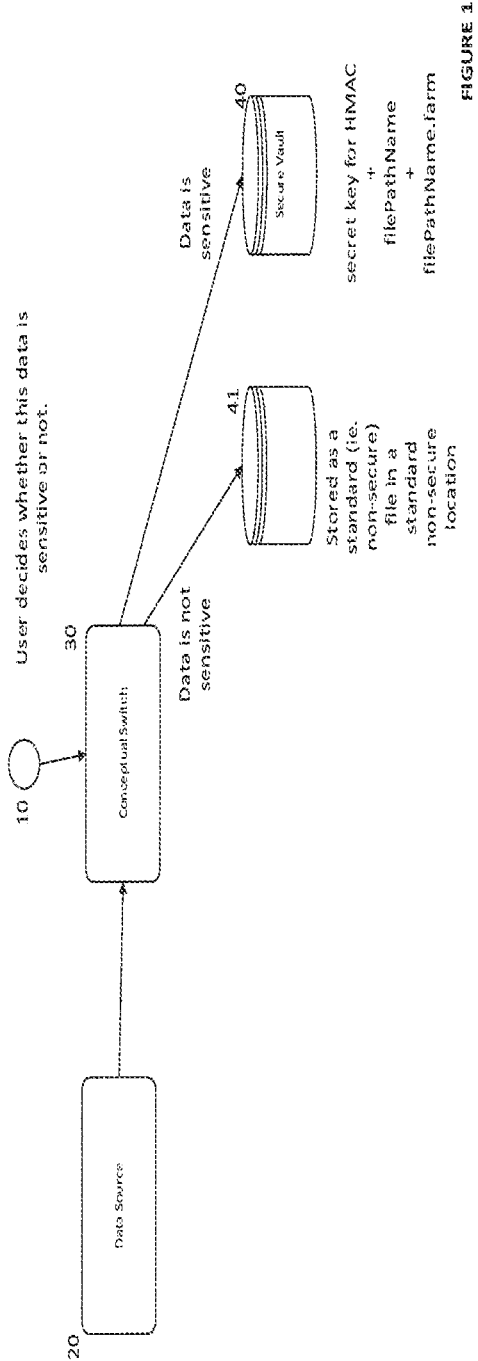
FIG. 1: The "file save" workflow for both standard (ie. non-secured) and secured files.

The "File Save" Workflow for Both Standard (ie. Non-Secured) and Secured Files (as Illustrated in FIG. 1):

The user initially decides [as depicted as 10 in FIG. 1] whether a given collection of data [as depicted as 20 in FIG. 1] is sensitive or not.

This user decision is represented in the system by the conceptual switch [as depicted as 30 in FIG. 1]. If this collection of data is deemed by the user to be not sensitive, it is stored as a standard non-secure file in a standard non-secure location on the device [as depicted as 41 in FIG. 1].

Whereas if this collection of data is deemed by the user to be sensitive, then the user decides which access-restriction policy or policies to secure the file with, and accordingly stores the file in the Secure Vault on the device together with the associated set of access-restriction policy files.

Note that the secret key for HMAC associated with the device for assuring the integrity and uniqueness of the subsequent file-retrieval attempt GRANT-or-DENY message exchange is already stored in the Secure Vault.

[This is depicted as 40 in FIG. 1].

The "File Retrieve" Workflow (as Illustrated in FIG. 2) and, for Secured Files, the File-Retrieval Attempt GRANT-or-DENY Decision Workflow (as Illustrated in FIG. 3):

(1) The user attempts to retrieve a content-file from the Secure Vault.

[This is the starting event as depicted as 100 in FIG. 2.]

(2) The operating system, as exemplified by Android, has been modified to intercept the associated operating system kernel-level function calls [as exemplified by the open( ) system call as depicted as 200 in FIG. 2] and perform the following actions instead.

(3) If the content-file whose retrieval is being sought is in the Secure Vault [as depicted as 300 in FIG. 2], the system as exemplified by Android sets up a Time-To-Live (TTL) flag within the file system [as depicted as 400 in FIG. 2].

If instead the content-file is elsewhere, or nowhere, normal processing is performed [as depicted as 310 in FIG. 2].

(4) A dedicated user-space System Service, the "Verdict Beseecher Service" [as depicted as 500 in FIG. 3], is exemplified by its implementation as an Android System Service. The "Verdict Beseecher Service" reads the TTL flag [as depicted as 600 in FIG. 3].

(5) The VerdictBeseecher "Verdict Beseecher Service", having determined TTL validity, sets up a Poll-for-Verdict-Response (PVR) flag and immediately launches the appropriate file-access-restriction methods via Secured Intent [as depicted as 700 in FIG. 3].

If instead the TTL flag either timed out or never existed at all, the open( ) request is refused [as depicted as 610 in FIG. 3].

(6) The file-access-restriction-method performs the associated pattern-matching and securely conveys its result, as a Grant or Deny verdict contained in a "securedResponse", towards the Verdict Beseecher Service [as depicted as 800 in FIG. 3].

(7) The "Verdict Beseecher Service" listens, within the PVR flag timer's lifetime [as depicted as 900 in FIG. 3], for a "securedResponse" from the farm to the Secured Intent (fired by the VerdictBeseecher). This "securedResponse" should contain a "farm.response" which should contain the farm's verdict—either "1" signifying GRANT or "0" signifying DENY [as depicted as 1000 in FIG. 3].

If instead the PVR flag times out, or the farm verdict is not received, or the farm verdict received is neither "1" nor "0", then content-file-access is refused [as depicted as 910 in FIG. 3].

(8) Within the TTL time-period a custom kernel process continuously interrogates the farm.response verdict for a "1", ie. a GRANT verdict.

If and only if the above kernel process sees a "1", ie. a GRANT verdict, within the TTL time-period does the kernel process leave the timer loop and open the content-file.

If instead, within the TTL time-period the above kernel process sees a "0", ie. a DENY verdict, the kernel process leaves the timer loop and refuses to open the content-file.

If instead, within the TTL time-period the above kernel process sees either nothing or something other than "1" or "0", that signifies an error; the kernel process leaves the timer loop and refuses to open the content-file.

If instead the TTL timer times out, that signifies a failure to receive the farm's "securedResponse"; the above kernel process refuses to open the content-file.

(9) Accordingly, the content-file access attempt succeeds or fails.

One specific implementation, but not limited thereto, is as follows: All the above components are implemented in an operating system kernel as exemplified by the Android Kernel AOSP (Android Open Source Project) C/C++ as Shared Objects for insertion into a secure library on a chip.

Another specific implementation, but not limited thereto, is as follows: All the above components are implemented in user-space as exemplified by the Android SDK (Software Development Kit) Java for user access as a remote subscription Web Service; such Web Service user-access implementation is exemplified by either WebSockets or REST API (Representational State Transfer Application Programming Interface).

What is claimed is:

1. A method for managing access to sensitive-content files stored on a device running an operating system, comprising:
    the sensitive-content files being deemed sensitive by a user and consequently placed by the user in an on-device secure vault together with each such sensitive-content file's associated file access restriction mechanism file or files specifying a file access restriction method;
    intercepting, at a kernel level of the operating system, an attempt to access a sensitive-content file in the secure vault;
    determining as valid or invalid the attempt to access in accordance with a time-to-live parameter;
    if valid, choosing and launching an access restriction method specified by the sensitive-content file's associated file access restriction mechanism, wherein the file access restriction mechanism file or files provide for at least a plurality of the following file access restriction mechanisms: face recognition, fingerprint recognition, and geolocation graticule;
    setting to a valid state a response flag of the access attempt in response to conditions of the file access restriction mechanism being satisfied by matching a registered device owner of the secure vault with the user attempting to access the sensitive-content file, and wherein the response flag is reset to invalid after a predetermined time;
    a service receiving a response of GRANT access or DENY access from the file access restriction method; and
    if a response of GRANT access is received during the valid state of the response flag, waking a thread of the operating system kernel causing it to execute an open( ) kernel function call on the sensitive-content file;
    whereby an expandable security framework is enabled by, in the course of time, causing the file access restriction mechanism file or files to provide for additional file access restriction mechanisms.

2. A method according to claim 1 wherein the file access-restriction mechanism is based on biometrics information.

3. A method according to claim 2 wherein the file access-restriction mechanism based on biometrics is provided by registered-user face recognition.

4. A method of claim 2 wherein the file access-restriction mechanism based on biometrics is provided by registered-user fingerprint recognition.

5. A method according to claim 1 wherein the file access-restriction mechanism is based on geolocation information.

6. A method according to claim 5 wherein geolocation information is obtained by testing a current geolocation point of the attempt to access to confirm whether it is within a geolocation graticule corresponding to a last successful save action performed upon the sensitive content file.

\* \* \* \* \*